United States Patent Office 2,849,490
Patented Aug. 26, 1958

2,849,490

HYDROGENATED KETONES AND THEIR PREPARATION

George O. Chase, Hawthorne, and Walter Kimel, Highland Park, N. J., assignors to Hoffmann-La Roche Inc., Nutley, N. J., a corporation of New Jersey No Drawing. Application August 13, 1956
Serial No. 603,790

7 Claims. (Cl. 260—586)

This invention relates to novel chemical compounds, which may be broadly identified as hydrogenated cyclic ketones; and to processes of preparing said compounds. More particularly, the ketones referred to can be identified as hydrogenation products, wherein only carbon-to-carbon-unsaturation has been reduced, to ketones having the formula (I) 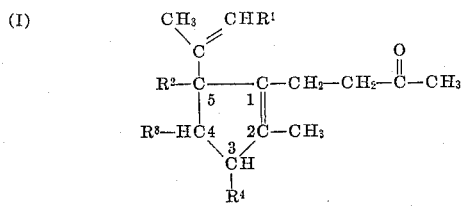

wherein each of the symbols $R^1$, $R^2$, $R^3$ and $R^4$ in the foregoing formula represents a member selected from the group consisting of hydrogen and lower acyclic hydrocarbon radicals. The invention also provides processes of making the novel cyclic hydrogenated ketones by reacting ketones of Formula I with elemental hydrogen in the presence of a hydrogenation catalyst.

One aspect of the invention, accordingly, relates to novel chemical compounds having the formula (II) 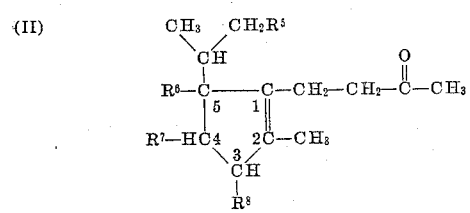

wherein each of the symbols, $R^5$, $R^6$, $R^7$ and $R^8$ represents a member selected from the group consisting of hydrogen and lower alkyl radicals. One process herein disclosed for making compounds of Formula II comprises reacting compounds of Formula I with elemental hydrogen in the presence of a hydrogenation catalyst under moderate hydrogenation conditions. A preferred embodiment of this process comprises reacting compounds of Formula I with elemental hydrogen in the presence of a palladium hydrogenation catalyst at temperatures not exceeding about 50° C. and under hydrogen pressures not exceeding about two atmospheres gauge. An especially preferred embodiment of this process comprises reacting compounds of Formula I with elemental hydrogen in the presence of a reduced palladium (i. e. palladium black)-on-calcium carbonate catalyst at temperatures between about 20° C. and about 30° C. and under hydrogen pressures not exceeding about 30 p. s. i. gauge.

A second aspect of the invention relates to novel chemical compounds having the formula (III) 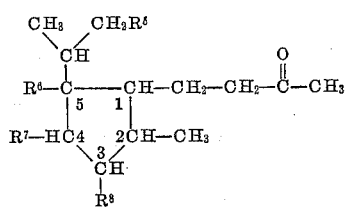

wherein each of the symbols $R^5$, $R^6$, $R^7$ and $R^8$ represents a member selected from the group consisting of hydrogen and lower alkyl radicals. One process herein disclosed for making compounds of Formula III comprises reacting compounds of Formula I [or alternatively, if desired, compounds of Formula II] with elemental hydrogen in the presence of a hydrogenation catalyst under severe hydrogenation conditions. A preferred embodiment of this process comprises reacting compounds of Formula I [or compounds of Formula II if it is so desired] with elemental hydrogen in the presence of a palladium hydrogenation catalyst at temperatures not less than about 100° C. and under hydrogen pressures not less than about 200 p. s. i. gauge. An especially preferred embodiment of this process comprises reacting compounds of Formula I [or alternatively, if desired, compounds of Formula II] with elemental hydrogen in the presence of a reduced palladium (i. e. palladium black)-on-calcium carbonate catalyst at temperatures not less than about 125° C. and under hydrogen pressures not less than about 500 p. s. i. gauge.

The catalytic hydrogenation processes of the invention are conveniently effected in liquid phase, the material to be hydrogenated being dissolved in an inert organic liquid solvent therefor. Preferred solvents are liquid aliphatic hydrocarbons or hydrocarbon fractions of predominantly aliphatic nature. Palladium hydrogenation catalysts are preferred, still greater preference being given to palladium black catalysts on a suitable support, such as calcium carbonate or charcoal. As indicated above, the severity of the reaction conditions determines whether the nuclear olefinic linkage, i. e. the double bond between the nuclear carbon atoms numbered 1 and 2 in Formula I above, is or is not reduced. Under moderate conditions of hydrogenation, only the carbon-to-carbon unsaturation present in the side chains attached to the nuclear carbon atoms numbered 3, 4 and 5 in Formula I is reduced; this carbon-to-carbon saturation always includes olefinic unsaturation present in the 5-substituent, as shown in Formula I, but can in addition include either olefinic or acetylenic unsaturation when present in acyclic hydrocarbon radicals comprehended within the meaning of the symbols $R^1$, $R^2$, $R^3$ and $R^4$ in Formula I. Under severe hydrogenation conditions, said nuclear 1-2 olefinic linkage, as well as said side chain unsaturation, is fully reduced.

The products of the invention represented by Formulas II and III are useful in perfumery, as odorants for the preparation of perfumes and of other scented compositions. These products of the invention possess odors generally reminiscent of violet and orris.

The starting materials for the processes of the invention, which materials are not claimed as part of the present invention, have not hitherto been described in any printed publication. In order that the present disclosure may be complete, it is now stated that these starting materials can be made by reacting an alcohol of the formula (IV)
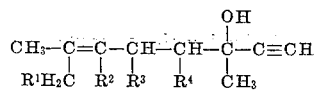

with an acetoacetic ester of the formula (V)
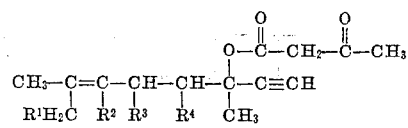

In the foregoing Formulas IV and V, $R^1$, $R^2$, $R^3$ and $R^4$ have the same significance previously indicated, with the further proviso that any particular symbol has the identical significance in each of the Formula I, IV and V above.

The alcohols of Formula IV above can be made conveniently by a general process which comprises reacting a ketone of the formula (VI)
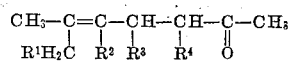

wherein the symbols $R^1$, $R^2$, $R^3$ and $R^4$ have the same meaning indicated above, with an alkali metal acetylide in liquid ammonia, and hydrolyzing the intermediate condensation product.

The acetoacetic acid esters of Formula V above can be made conveniently by a general process which comprises condensing an alcohol of Formula IV above with diketene.

For convenience of reference, the preparation of the specific starting materials employed in Examples 1 to 12 below is herewith indicated:

(A) PREPARATION OF 4-(2-METHYL-5-ISOPROPENYL-1-CYCLOPENTEN-1-YL)-2-BUTANONE

A mixture of 236 g. of racemic 3,7-dimethyl-6-octen-1-yn-3-ol (dehydrolinalool) and 236 g. of 3,7-dimethyl-6-octen-1-yn-3-yl acetoacetate (prepared by condensing diketene with racemic dehydrolinalool) was heated by an oil bath to about 150° C., while stirring vigorously. A slow evolution of carbon dioxide occurred. This terminated after about eight hours. The source of heat was then removed, and the reaction mixture was cooled. The desired reaction product, 4-(2-methyl-5-isopropenyl-1-cyclopenten-1-yl)-2-butanone, was isolated by fractional distillation in vacuo. It had B. P. 72°–75° C. (0.5 mm.); $n_D^{25}=1.4800$; semicarbazone (from 5% ethanol) M. P. 136° C.; 4-phenylsemicarbazone (from 50% ethanol), M. P. 101° C.; 2,4-dinitrophenylhydrazone (from ethanol), M. P. 87.5° C.

(B) PREPARATION OF 4-(2,5-DIMETHYL-5-ISOPROPENYL-1-CYCLOPENTEN-1-YL)-2-BUTANONE

A mixture of 250 g. of racemic 3,6,7-trimethyl-6-octen-1-yn-3-ol and 250 g. of 3,6,7-trimethyl-6-octen-1-yn-3-yl acetoacetate (prepared by condensing diketene with racemic 3,6,7-trimethyl-6-octen-1-yn-3-ol) was placed in a 1-liter, 3-neck flask. The flask was then heated by an oil bath to 150° C. so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution in order to eliminate acidic byproducts, and was then washed with water until neutral. The organic layer was dried over calcium sulfate and subjected to vacuum fractional distillation. The product, 4-(2,5-dimethyl-5-isopropenyl-1-cyclopenten-1-yl)-2-butanone, was obtained in a fraction having B. P. 68°–70° C. (0.1 mm.); $n_D^{25}=1.4839$; semicarbazone M. P. 151°–152° C.

(C) PREPARATION OF 4-[2-METHYL-5-(2-BUTEN-2-YL)-1-CYCLOPENTEN-1-YL]-2-BUTANONE

A mixture of 250 g. of racemic 3,7-dimethyl-6-nonen-1-yn-3-yl acetoacetate (prepared by condensing diketene with 3,7-dimethyl-6-nonen-1-yn-3-ol) and an equal weight of 3,7-dimethyl-6-nonen-1-yn-3-ol was placed in a 1-liter, 3-neck flask. The flask was then heated by an oil bath to such a temperature (150°–155° C.) that carbon dioxide was eliminated from the reaction mixture at a rate of about 0.1 mole per hour. After eight hours, the evolution of carbon dioxide had virtually ceased. The mixture was diluted with 300 cc. of petroleum ether, and was extracted several times with saturated aqueous sodium bicarbonate solution in order to eliminate acidic byproducts, and was then washed with water until neutral. The organic layer was dried over calcium sulfate and subjected to vacuum fractional distillation. The product, 4-[2-methyl-5-(2-buten-2-yl)-1-cyclopenten-1-yl]-2-butanone, was obtained in a fraction having B. P. 88°–89° C. (0.6 mm.); $n_D^{25}=1.4828$; M. P. of semicarbazone, 122° C.

The starting materials for the above, 3,7-dimethyl-6-nonen-1-yn-3-ol and 3,7-dimethyl-6-nonen-1-yn-3-yl acetoacetate, were prepared by the following procedure (also not part of the present invention):

600 g. of 3-methyl-1-penten-3-ol was cooled to $+15°$ C. with an ice bath, then 1800 cc. of concentrated aqueous hydrochloric acid (37%) was poured into the reaction vessel. The mixture was stirred for 30 minutes. The oil, comprising essentially 1-chloro-3-methyl-2-pentene, was separated, washed three times with 500 cc. of water and dried over calcium chloride.

Four liters of benzene, 1040 g. of ethyl acetoacetate and 378 g. of sodium methylate were stirred into a 12-liter flask. 696 g. of 1-chloro-3-methyl-2-pentene as produced above was added from a separatory funnel in two hours at 60° C. The stirring was then continued at 60° overnight.

The mixture was diluted with four liters of water. The oil was separated and the benzene was distilled off under vacuum. The thick residue, 3-carbethoxy-6-methyl-5-octen-2-one, was placed in a 5-liter flask with 2 liters of ethyl alcohol, 1 liter of water and 500 g. of potassium hydroxide. This was stirred for two hours, then allowed to stand overnight, thereby forming the potassium salt of 3-carboxy-6-methyl-5-octen-2-one.

Concentrated hydrochloric acid was added to the stirred reaction mixture from a separatory funnel until strongly acid. The oil layer was removed, and the aqueous portion was extracted with one liter of benzene. The combined oils were water-washed and fractionated to yield 6-methyl-5-octen-2-one, distilling at 65° C. (10 mm.), $n_D^{25}=1.4412$.

84 g. of metallic sodium was dissolved in 3 liters of liquid ammonia. Acetylene was bubbled into the stirred solution until its color changed from blue to white. 420 g. of 6-methyl-5-octen-2-one was dissolved in 500 cc. of diethyl ether and dropped into the stirred reaction mixture in one hour. Stirring was then continued for three hours while a slow stream of acetylene was bubbled in. The flow of acetylene was then stopped, but the stirring was continued for about 15 hours. The ammonia was distilled off and the residue in the reaction vessel was washed with 2 liters of 5% aqueous sulfuric acid. The product was water-washed, dried over anhydrous calcium sulfate and fractionated to yield 3,7-dimethyl-6-nonen-1-yn-3-ol, distilling at 89° C. (10 mm.), $n_D^{25}=1.4612$.

In a 2-liter, 3-neck flask equipped with a mechanical stirrer, thermometer and dropping funnel, 332.4 g. of 3,7-dimethyl-6-nonen-1-yn-3-ol was dissolved in a mixture of 330 cc. of petroleum ether, 4 cc. of pyridine and 4 cc. of acetic acid. To this solution was added, dropwise, during two hours, 185 g. of diketene, while maintaining a reaction temperature of 20°–30° C. by external cooling. The reaction was allowed to continue at that temperature for six hours longer. Then, the mixture was washed twice with 200 c. portions of 10% aqueous sulfuric acid, six times with 200 cc. of aqueous saturated sodium bicarbonate solution, and finally with water until neutral. The petroleum ether layer was dried over anhydrous calcium sulfate, and the solvent was removed by distillation in vacuo, leaving 3,7-dimethyl-6-nonen-1-yn-3-yl acetoacetate, $n_D^{25}=1.4653$.

(D) PREPARATION OF 4-(2-METHYL-3-ETHYL-5-ISOPROPENYL - 1 - CYCLOPENTEN - 1 - YL) - 2-BUTANONE

A mixture of 264 g. of racemic 3,7-dimethyl-4-ethyl-6-octen-1-yn-3-yl acetoacetate (prepared by condensing diketene with 3,7-dimethyl-4-ethyl-6-octen-1-yn-3-ol) and 264 g. of 3,7-dimethyl-4-ethyl-6-octen-1-yn-3-ol was placed in a 1-liter, 3-neck flask. The flask was then heated by an oil bath to 150°–155° C., so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4-(2-methyl-3-ethyl-5-isopropenyl-1-cyclopenten-1-yl)-2-butanone, was obtained in a fraction having B. P. 90°–92° C. (0.4 mm.); $n_D^{25}=1.4785$; M. P. of semicarbazone, 97.5° C.

The starting materials for Preparation (D) above, 3,7-dimethyl-4-ethyl-6-octen-1-yn-3-ol and 3,7-dimethyl-4-ethyl-6-octen-1-yn-3-yl acetoacetate, were prepared by the following procedure (also not part of the present invention):

To a solution of 92 g. of sodium in 2 liters of ethanol was added, at 10° C., 816 g. of 1,1-dimethyl-2-propen-1-yl acetoacetate. To this solution was added, during three hours at 10° C., 436 g. of ethyl bromide. The mixture was stirred for 20 hours at room temperature. Then, the precipitate of sodium bromide was removed by filtration. The resulting solution was concentrated in vacuo, and the crude product was dissolved in petroleum ether. It was washed with ice-cold 4% aqueous sodium hydroxide solution to remove excess 1,1-dimethyl-2-propen-1-yl acetoacetate, with cold dilute acetic acid, and finally with water until neutral. The solvent layer was dried over calcium sulfate, concentrated, and finally distilled in vacuo. The product, dimethyl vinyl carbinyl α-ethyl-acetoacetate, was collected at 46°–51° C. (0.9 mm.); $n_D^{25}=1.4352$.

400 g. of dimethyl vinyl carbinyl α-ethyl-acetoacetate was placed in a 1-liter, 3-neck flask, and, with vigorous stirring, was heated to 160°–170° C., whereupon a rapid evolution of carbon dioxide occurred. Heating was continued until the evolution of gas ceased. The product, 3-ethyl-6-methyl-5-hepten-2-one, was isolated by vacuum fractional distillation. It had B. P. 69°–70° C. (7 mm.); $n_D^{25}=1.4401$.

Acetylene was bubbled rapidly into a solution of 138 g. of sodium in 2 liters of liquid ammonia until the characteristic blue color disappeared. Then, while the addition of acetylene was continued at a diminished rate, a solution of 770 g. of 3-ethyl-6-methyl-5-hepten-2-one in 750 cc. of dry diethyl ether was added, dropwise, with efficient stirring, during two hours. Stirring was continued for 20 hours, in an acetylene atmosphere. Then, the ammonia was removed by evaporation, and the resulting solution was poured cautiously, with external cooling, into 2.5 liters of a stirred solution of 15% aqueous sulfuric acid, at such a rate that the temperature did not exceed 20° C. The organic layer was separated, and the aqueous layer was extracted with 250 cc. of diethyl ether. The combined ether layers were washed with sodium bicarbonate solution, and then with water until neutral. After being dried over calcium sulfate, the organic portion was concentrated in vacuo and distilled. The product, 3,7-dimethyl-4-ethyl-6-octen-1-yn-3-ol, was obtained as a colorless liquid at 69°–70° C. (1 mm.); $n_D^{25}=1.4669$.

To a mixture of 405.7 g. of 3,7-dimethyl-4-ethyl-6-octen-1-yn-3-ol and 400 cc. of petroleum ether was added 4.5 cc. each of pyridine and acetic acid. To this solution was added dropwise, with stirring, 208.1 g. of diketene over a period of two hours. Sufficient external cooling was employed to maintain a reaction temperature of 25°–30° C. After eight hours, the reaction mixture was washed successively with 15% aqueous sulfuric acid, saturated aqueous sodium bicarbonate solution, and then water until neutral. It was dried over calcium sulfate, and concentrated in vacuo, leaving the product, 3,7-dimethyl - 4 - ethyl - 6 - octen - 1 - yn - 3 - yl acetoacetate; $n_D^{25}=1.4701$.

(E) PREPARATION OF 4-(2-METHYL-3-PROPARGYL - 5 - ISOPROPENYL - 1 - CYCLOPENTEN - 1-YL)-2-BUTANONE

A mixture of 274 g. of racemic 3,7-dimethyl-4-propargyl-6-octen-1-yn-3-yl acetoacetate (prepared by condensing diketene with 3,7-dimethyl-4-propargyl-6-octen-1-yn-3-ol) and 274 g. of 3,7-dimethyl-4-propargyl-6-octen-1-yn-3-ol was placed in a 1-liter, 3-neck flask. The flask was then heated by an oil bath to 150° C. so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4-(2-methyl-3-propargyl-5-isopropenyl-1-cyclopenten-1-yl)-2-butanone, was obtained in a fraction having B. P. 101°–103° C. (0.4 mm.); $n_D^{25}=1.4952$; M. P. of semicarbazone, 110°–111° C.

The starting materials for Preparation (E), 3,7-dimethyl - 4 - propargyl - 6 - octen - 1 - yn - 3 - ol and 3,7-dimethyl - 4 - propargyl - 6 - octen - 1 - yn - 3 - yl acetoacetate, were prepared by the following procedure (also not part of the present invention):

To a solution of 92 g. of sodium in 2 liters of ethanol was added, at 10° C., 816 g. of 1,1-dimethyl-2-propen-1-yl acetoacetate. To this solution was added, during three hours at 10° C., 476 g. of propargyl bromide. The mixture was stirred for 20 hours at room temperature. Then, the precipitate of sodium bromide was removed by filtration. The resulting solution was concentrated in vacuo, and the crude product was dissolved in petroleum ether. It was washed with ice-cold 4% aqueous sodium hydroxide solution to remove excess 1,1-dimethyl-2-propen-1-yl acetoacetate, with cold dilute acetic acid, and finally with water until neutral. The solvent layer was dried over calcium sulfate, concentrated, and finally distilled in vacuo. The product, dimethyl vinyl carbinyl α-propargyl-acetoacetate, was collected at 70° C. (0.5 mm.); $n_D^{25}=1.454$.

400 g. of dimethyl vinyl carbinyl α-propargyl-acetoacetate was placed in a 1-liter, 3-neck flask, and, with vigorous stirring, was heated to 160°–170° C., whereupon a rapid evolution of carbon dioxide occurred. Heating was continued until the evolution of gas ceased. The product 3-propargyl-6-methyl-5-hepten-2-one, was isolated by vacuum fractional distillation. It had B. P. 100°–103° C. (13 mm.); $n_D^{25}=1.4639$.

Acetylene was bubbled rapidly into a solution of 138 g. of sodium in 2 liters of liquid ammonia until the characteristic blue color disappeared. Then, while the addition of acetylene was continued at a diminished rate, a solution of 820 g. of 3-propargyl-6-methyl-5-hepten-2-one in 750 cc. of dry diethyl ether was added, dropwise, with efficient stirring, during two hours. Stirring was continued for 20 hours, in an acetylene atmosphere. Then, the ammonia was removed by evaporation, and the resulting solution was poured cautiously, with external cooling, into 2.5 liters of a stirred solution of 15% aqueous sulfuric acid, at such a rate that the temperature did not exceed 20° C. The organic layer was separated, and the aqueous layer was extracted with 250 cc. of diethyl ether. The combined ether layers were washed with sodium bicarbonate solution, and then with water until neutral. After being dried over calcium sulfate, the organic portion was concentrated in vacuo and distilled. The product, 3,7-dimethyl-4-propargyl-6-octen-1-yn-3-ol, was obtained as a colorless liquid at 83°–86° C. (0.7 mm.); $n_D^{25}$=1.4645.

To a mixture of 528 g. of 3,7-dimethyl-4-propargyl-6-octen-1-yn-3-ol and 400 cc. of petroleum ether was added 4.5 cc. each of pyridine and acetic acid. To this solution was added dropwise, with stirring, 208.1 g. of diketene over a period of two hours. Sufficient external cooling was employed to maintain a reaction temperature of 25°–30° C. After eight hours, the reaction mixture was washed successively with 15% aqueous sulfuric acid, saturated aqueous sodium bicarbonate solution, and then water until neutral. It was dried over calcium sulfate, and concentrated in vacuo, leaving the product, 3,7-dimethyl-4-propargyl-6-octen-1-yn-3-yl acetoacetate, $n_D^{25}$=1.4840.

(F) PREPARATION OF 4-[2-METHYL-3-ALLYL-5-(2 - BUTEN - 2 - YL) - 1 - CYCLOPENTEN - 1-YL]-2-BUTANONE

A mixture of 290 g. of racemic 3,7-dimethyl-4-allyl-6-nonen-1-yn-3-yl acetoacetate (prepared by condensing diketene with 3,7-dimethyl-4-allyl-6-nonen-1-yn-3-ol) and 290 g. of 3,7 - dimethyl - 4 - allyl - 6 - nonen - 1 - yn-3-ol was placed in a 1-liter, 3-neck flask. The flask was then heated by an oil bath to 150°–155° C. so that carbon dioxide was eliminated from the reaction mixture. When the evolution of carbon dioxide had ceased, the mixture was diluted with 300 cc. of petroleum ether, and was extracted several times with saturated aqueous sodium bicarbonate solution, and was then washed with water until neutral. The organic layer was dried over calcium sulfate and subjected to vacuum fractional distillation. The product, 4 - [2 - methyl - 3 - allyl - 5 - (2 - buten - 2 - yl)-1-cyclopenten-1-yl]-2-butanone, was obtained in a fraction having B. P. 107°–110° C. (0.7 mm.); $n_D^{25}$=1.4898; M. P. of semicarbazone, 122° C.

The starting materials for Preparation (F), 3,7-dimethyl - 4 - allyl - 6 - nonen - 1 - yn - 3 - ol and 3,7-dimethyl-4-allyl-6-nonen-1-yn-3-yl acetoacetate, were prepared by the following procedure (also not part of the present invention):

To a solution of 92 g. of sodium in 2 liters of ethanol was added, at 10° C., 883 g. of 3-methyl-1-penten-3-yl acetoacetate. To this solution was added, during three hours at 10° C., 484 g. of allyl bromide. The mixture was stirred for 20 hours at room temperature. Then, the precipitate of sodium bromide was removed by filtration. The resulting solution was concentrated in vacuo, and the crude product was dissolved in petroleum ether. It was washed with ice-cold 4% aqueous sodium hydroxide solution to remove excess 3-methyl-1-penten-3-yl acetoacetate, with cold dilute acetic acid, and finally with water until neutral. The solvent layer was dried over calcium sulfate, concentrated, and finally distilled in vacuo. The product, ethyl methyl vinyl carbinyl α-allyl-acetoacetate, was collected at 75°–80° C. (0.7 mm.); $n_D^{25}$=1.4532.

400 g. of ethyl methyl vinyl carbinyl α-allyl-acetoacetate was placed in a 1-liter, 3-neck flask, and, with vigorous stirring, was heated to 160°–170° C., whereupon a rapid evolution of carbon dioxide occurred. Heating was continued until the evolution of gas ceased. The product, 3-allyl-6-methyl-5-octen-2-one, was isolated by vacuum fractional distillation. It had B. P. 114° C. (18 mm.); $n_D^{25}$=1.457–1.458.

Acetylene was bubbled rapidly into a solution of 138 g. of sodium in 2 liters of liquid ammonia until the characteristic blue color disappeared. Then, while the addition of acetylene was continued at a diminished rate, a solution of 900 g. of 3-allyl-6-methyl-5-octen-2-one in 750 cc. of dry diethyl ether was added, dropwise, with efficient stirring, during two hours. Stirring was continued for 20 hours, in an acetylene atmosphere. Then, the ammonia was removed by evaporation, and the resulting solution was poured cautiously, with external cooling, into 2.5 liters of a stirred solution of 15% aqueous sulfuric acid, at such a rate that the temperature did not exceed 20° C. The organic layer was separated, and the aqueous layer was extracted with 250 cc. of diethyl ether. The combined ether layers were washed with sodium bicarbonate solution, and then with water until neutral. After being dried over calcium sulfate, the organic portion was concentrated in vacuo and distilled. The product, 3,7-dimethyl - 4 - allyl - 6 - nonen - 1- yn - 3 - ol, was obtained as a colorless liquid at 83°–85° C. (0.6 mm.); $n_D^{25}$=1.4780.

To a mixture of 463.5 g. of 3,7-dimethyl-4-allyl-6-nonen-1-yn-3-ol and 400 cc. of petroleum ether was added 4.5 cc. each of pyridine and acetic acid. To this solution was added dropwise, with stirring, 208.1 g. of diketene over a period of two hours. Sufficient external cooling was employed to maintain a reaction temperature of 25°–30° C. After eight hours, the reaction mixture was washed successively with 15% aqueous sulfuric acid, saturated aqueous sodium bicarbonate solution, and then water until neutral. It was dried over calcium sulfate, and concentrated in vacuo, leaving the product, 3,7-dimethyl-4-allyl-6-nonen-1-yn-3-yl acetoacetate, $n_D^{25}$=1.4792.

The disclosure in paragraphs (A) to (F) above, inclusive, is not claimed as part of the present invention.

The invention is further disclosed in the following examples which are illustrative but not limitative thereof. Temperatures are stated in degrees centigrade, uncorrected.

*Example 1*

(a) 192.2 g. of 4-(2-methyl-5-isopropenyl-1-cyclopenten-1-yl)-2-butanone was diluted with 192 cc. of petroleum naphtha (boiling range 60°–85°) and 19.2 g. of palladium black-on-calcium carbonate catalyst (containing 5% by weight Pd metal) was added. Hydrogenation was then initiated at 2–3 p. s. i. gauge hydrogen pressure, the temperature being maintained at about 25° by cooling with a water bath. Uptake of hydrogen ceased sharply about four hours later, after 0.986 mol equivalent of hydrogen had been consumed. The catalyst was removed by filtration, and was washed with a small quantity of the same petroleum naphtha, which was added to the filtrate. The solvent was removed from the filtrate by distillation at atmospheric pressure, and the residual liquid was purified by vacuum distillation. The product, 4-(2-methyl-5-isopropyl- 1 -cyclopenten-1-yl)-2-butanone, was obtained at 67° (0.2 mm.); $n_D^{25}$=1.4681; as a water-white liquid. It formed a semicarbazone of M. P. 142°.

(b) To a solution of 1200 g. of 4-(2-methyl-5-isopropenyl-1-cyclopenten-1-yl)-2-butanone in 1200 cc. of petroleum naphtha (60°–85°) was added 80 g. of the same catalyst used in Example 1 (a) above. The mixture was hydrogenated at 25° under hydrogen pressures varying from 10 p. s. i. gauge to 30 p. s. i. gauge. Periodically, when the rate of hydrogen uptake decreased appreciably, additional portions of catalyst were introduced, so that a total of 200 g. of catalyst was employed. Consumption of hydrogen was 94% of theory. Finally, the catalyst was removed by filtration, and the filtrate was subjected to vacuum distillation through a Vigreux column. The chief product was 4-(2-methyl-5-isopropyl-1-cyclopenten-1-yl)-2-butanone; B. P. 80°–82° (1 mm.); $n_D^{25}$=1.4681. It formed a semicarbazone of M. P. 140°.

Example 2

A mixture of 150 g. of 4-(2,5-dimethyl-5-isopropenyl-1-cyclopenten-1-yl)-2-butanone, 150 cc. of petroleum naphtha (60°–85°) and 45 g. of the same catalyst employed in Example 1 (added in three portions) was hydrogenated at 25° under hydrogen pressures varying from 10 p. s. i. gauge to 30 p. s. i. gauge, until consumption of hydrogen ceased. Uptake of hydrogen was 0.93 mol equivalent. After removal of the catalyst by filtration, the product was purified by vacuum distillation. 4-(2,5-dimethyl-5-isopropyl-1-cyclopenten-1-yl)-2-butanone was obtained at B. P. 65°–67° (0.5 mm.); $n_D^{25}$=1.4690; semicarbazone, M. P. 141°.

Example 3

100 g. of 4-[2-methyl-5-(2-buten-2-yl)-1-cyclopenten-1-yl]-2-butanone, dissolved in 150 cc. of petroleum naphtha (60°–85°), was hydrogenated at 25° under hydrogen pressures varying from 10 p. s. i. gauge to 30 p. s. i. gauge in the presence of 35 g. (added in three portions) of the same catalyst employed in Example 1. When no further hydrogen was consumed, the mixture was filtered, and the filtrate was distilled in vacuo. 4-(2-methyl-5-sec.-butyl-1-cyclopenten-1-yl)-2-butanone was obtained as a water-white liquid, B. P. 73°–75° (0.6 mm.); $n_D^{25}$=1.4743; semicarbazone, M. P. 124°.

Example 4

A mixture of 100 g. of 4-(2-methyl-3-ethyl-5-isopropenyl-1-cyclopenten-1-yl)-2-butanone, 150 cc. of petroleum naphtha (60°–85°), and 20 g. (added in two portions) of the same catalyst employed in Example 1 was hydrogenated at 25° under hydrogen pressures varying from 10 p. s. i. gauge to 30 p. s. i. gauge. Uptake of hydrogen was 95% of theory after 13 hours. The catalyst was removed by filtration, and the filtrate was vacuum distilled, yielding 4-(2-methyl-3-ethyl-5-isopropyl-1-cyclopenten-1-yl)-2-butanone at 88°–90° (0.5 mm.); $n_D^{25}$=1.4688. It formed a semicarbazone of M. P. 92°.

Example 5

A solution of 100 g. of 4-(2-methyl-3-propargyl-5-isopropenyl-1-cyclopenten-1-yl)-2-butanone in 150 cc. of petroleum naphtha (60°–85°) was hydrogenated at 25° under hydrogen pressures varying from 10 p. s. i. gauge to 30 p. s. i. gauge in the presence of 20 g. (added in two portions) of the same catalyst employed in Example 1. When consumption of hydrogen had ceased, a total of 2.91 mol equivalents had been absorbed. The catalyst was removed by filtration, and the product was purified by distillation in vacuo. 4-(2-methyl-3-propyl-5-isopropyl-1-cyclopenten-1-yl)-2-butanone was obtained, B. P. 97°–98° (0.7 mm.); $n_D^{25}$=1.4688; semicarbazone M. P. 112°.

Example 6

A mixture of 125 g. of 4-[2-methyl-3-allyl-5-(2-buten-2-yl)-1-cyclopenten-1-yl]-2-butanone, 150 cc. of petroleum naphtha (60°–85°) and 45 g. (added in two portions) of the same catalyst employed in Example 1 was hydrogenated at 25° under hydrogen pressures varying from 10 p. s. i. gauge to 30 p. s. i. gauge. Uptake of hydrogen was 1.9 mol equivalents. After filtration from the catalyst, the product was distilled in vacuo. 4-(2-methyl-3-propyl-5-sec.-butyl-1-cyclopenten-1-yl)-2-butanone was obtained as a water-white liquid at 102°–104° (0.6 mm.); $n_D^{25}$=1.4729; semicarbazone M. P. 129.5°.

Example 7

(a) A mixture of 250 g. of 4-(2-methyl-5-isopropenyl-1-cyclopenten-1-yl)-2-butanone, 2000 ml. of n-hexane, and 25 g. of the same 5% Pd-CaCO₃ catalyst used in Example 1 above was placed in a 5 gallon autoclave, and agitated under 500 p. s. i. gauge hydrogen pressure for two hours, without external cooling. Then, an additional liter of n-hexane and 25 g. of the same catalyst were added, and the hydrogenation was continued at 500 p. s. i. gauge hydrogen pressure at 125° C. for four hours. The contents of the autoclave were allowed to cool, and the catalyst was removed by filtration. The solvent was evaporated in vacuo, and the product was purified by vacuum fractional distillation. The product, 4-(2-methyl-5-isopropyl-1-cyclopentyl)-2-butanone, was obtained as a water-white liquid, B. P. 58°–60° C. (0.2 mm.); $n_D^{25}$=1.4559; semicarbazone, M. P. 156°.

(b) 650 g. of 4-(2-methyl-5-isopropenyl-1-cyclopenten-1-yl)-2-butanone was dissolved in an equal volume of acetic acid, and was hydrogenated in the presence of 25 g. of palladium black-on-charcoal catalyst (containing 10% by weight Pd metal) for 12 hours under 1000 p. s. i. gauge hydrogen pressure at 25°. The product was 4-(2-methyl-5-isopropyl-1-cyclopentyl)-2-butanone.

Example 8

A mixture of 60 g. of 4-(2,5-dimethyl-5-isopropyl-1-cyclopenten-1-yl)-2-butanone, 70 cc. of petroleum naphtha (60°–85°), and 3 g. of 5% Pd-CaCO₃ catalyst (same catalyst as in Example 1), was placed in a rocking autoclave at 500 p. s. i. gauge hydrogen pressure. The autoclave was shaken for five hours while heating up to 155°. Then, heating was stopped, and shaking was continued overnight while the mixture was allowed to cool to room temperature. The catalyst was removed by filtration, and the product, 4-(2,5-dimethyl-5-isopropyl-1-cyclopentyl)-2-butanone, was isolated by distillation in vacuo; B. P. 81°–83° (0.1 mm.); $n_D^{25}$=1.4570.

Example 9

An autoclave was charged with 63 g. of 4-(2-methyl-5-sec.-butyl-1-cyclopenten-1-yl)-2-butanone, 65 cc. of petroleum naphtha (60°–85°) and 3.2 g. of the same 5% Pd-CaCO₃ catalyst used in Example 1. The autoclave was subjected to 500 p. s. i. gauge hydrogen pressure and heated up to 170°. When the mixture had attained that temperature (two hours) the heater was turned off, but rocking of the autoclave was continued overnight while the contents cooled to room temperature. Finally, the catalyst was filtered off, and the filtrate was distilled in vacuo. The chief product was 4-(2-methyl-5-sec.-butyl-1-cyclopentyl)-2-butanone; B. P. 78° (0.5 mm.); $n_D^{25}$=1.4575.

Example 10

52 g. of 4-(2-methyl-3-ethyl-5-isopropyl-1-cyclopenten-1-yl)-2-butanone was dissolved in 75 cc. of petroleum naphtha (60°–85°) in a rocking-type autoclave. To the solution was added 2.6 g. of 5% Pd-CaCO₃ catalyst (same catalyst as in Example 1), and the autoclave was charged with hydrogen to 500 p. s. i. gauge. Then, the rocking mechanism was started and the autoclave was heated until a temperature of 128° was reached (90 minutes). The heater was turned off, but rocking was continued until the mixture had cooled to room temperature. Finally, the catalyst was removed by filtration, and the filtrate was vacuum distilled. There was thus obtained 4-(2-methyl-3-ethyl-5-isopropyl-1-cyclopentyl)-2-butanone, B. P. 82.5° (0.48 mm.); $n_D^{25}$=1.4667.

Example 11

A mixture of 60 g. of 4-(2-methyl-3-propyl-5-isopropyl-1-cyclopenten-1-yl)-2-butanone, 75 cc. of petroleum naphtha (60°–85°) and 3 g. of the same Pd-CaCO₃ catalyst used in Example 1 was placed in an autoclave under 500 p. s. i. gauge hydrogen pressure. The mixture was heated up to 146°, and then heating was stopped. After the mixture had cooled to room temperature, the catalyst was filtered off, and the filtrate was distilled in vacuo. The product, 4-(2-methyl-3-propyl-5-isopropyl-1-cyclopentyl)-2-butanone, was collected at 87° (0.5 mm.); $n_D^{25}$=1.4673.

Example 12

To a solution of 53 g. of 4-(2-methyl-3-propyl-5-sec.-butyl-1-cyclopenten-1-yl)-2-butanone in 75 cc. of petroleum naphtha (60°–85°) was added 2.6 g. of 5% Pd-CaCO$_3$ catalyst (same catalyst as in Example 1). The mixture was placed in a rocking-type autoclave at 500 p. s. i. gauge hydrogen pressure. The rocking mechanism was started, and the autoclave was heated up to a temperature of 146°. Then, the heater was turned off, but shaking was continued until the autoclave had cooled to room temperature. The reaction mixture was separated from catalyst by filtration, and the product was vacuum distilled. 4-(2-methyl-3-propyl-5-sec.-butyl-1-cyclopentyl)-2-butanone was obtained as a water-white liquid, B. P. 100° (0.5 mm.); $n_D^{25} = 1.4666$.

We claim:

1. A compound selected from the group consisting of those having the formulas

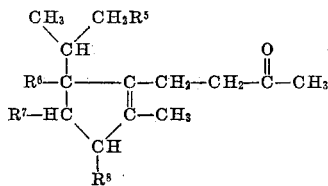

and

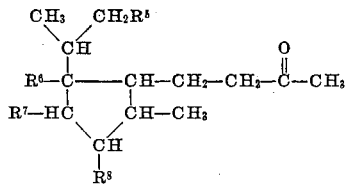

wherein, in each of the foregoing formulas, each of the symbols $R^5$, $R^6$, $R^7$ and $R^8$ represents a member from the group consisting of hydrogen and lower alkyl radicals.

2. A compound having the formula

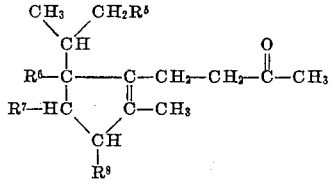

wherein each of the symbols $R^5$, $R^6$, $R^7$ and $R^8$ represents a member selected from the group consisting of hydrogen and lower alkyl radicals.

3. A process of making a compound according to claim 2 which comprises reacting with elemental hydrogen, in the presence of a palladium hydrogenation catalyst at temperatures not exceeding about 50° C. and under hydrogen pressures not exceeding about two atmospheres gauge, a compound having the formula

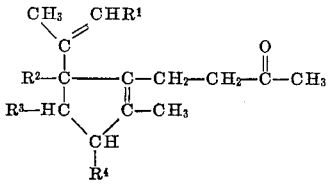

wherein each of the symbols $R^1$, $R^2$, $R^3$ and $R^4$ represents a member selected from the group consisting of hydrogen and lower acyclic hydrocarbon radicals.

4. A compound having the formula

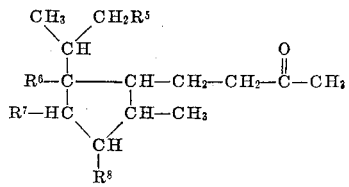

wherein each of the symbols $R^5$, $R^6$, $R^7$ and $R^8$ represents a member selected from the group consisting of hydrogen and lower alkyl radicals.

5. A process of making a compound according to claim 4 which comprises reacting with elemental hydrogen, in the presence of a palladium hydrogenation catalyst at temperatures not less than about 100° C. and under hydrogen pressures not less than about 200 p. s. i. gauge, a compound having the formula

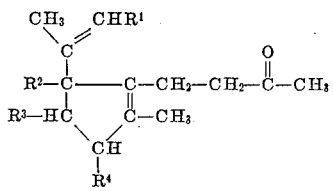

wherein each of the symbols $R^1$, $R^2$, $R^3$ and $R^4$ in the foregoing formula represents a member selected from the group consisting of hydrogen and lower acyclic hydrocarbon radicals.

6. A process of making a compound according to claim 4 which comprises reacting with elemental hydrogen, in the presence of a palladium hydrogenation catalyst at temperatures not less than about 100° C. and under hydrogen pressures not less than about 200 p. s. i. gauge, a compound having the formula

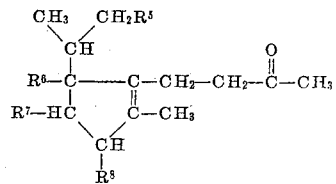

wherein each of the symbols $R^5$, $R^6$, $R^7$ and $R^8$ represents a member selected from the group consisting of hydrogen and lower alkyl radicals.

7. 4-(2-methyl-5-isopropyl-1-cyclopenten-1-yl)-2-butanone.

References Cited in the file of this patent

Kon, J. Chem. Soc. (London) vol. 119, pp. 823–824 (1921).

Simonsen, "The Terpenes," vol. (2d ed.) pp. 441–442 (1947).

UNITED STATES PATENT OFFICE
CERTIFICATE OF CORRECTION

Patent No. 2,849,490                                                    August 26, 1958

George O. Chase et al.

It is hereby certified that error appears in the printed specification of the above numbered patent requiring correction and that the said Letters Patent should read as corrected below.

Column 1, line 20, for "to ketones" read -- of ketones --; column 3, line 19, for "Formula" read -- Formulas --; line 52, for "5%" read -- 50% --; column 5, line 4, for "200 c." read -- 200 cc. --; column 7, line 14, for "528 g." read -- 428 g. --; column 9, line 72, for "Pd-CaCo3" read -- Pd-CaCO3 --; column 11, line 37, for "member from" read -- member selected from --; column 12, line 63, under references cited, for "vol. (2d" read -- vol. I (2d --.

Signed and sealed this 11th day of November 1958.

(SEAL)
Attest:

KARL H. AXLINE
Attesting Officer

ROBERT C. WATSON
Commissioner of Patents